United States Patent
Crabtree (10) Patent No.: US 8,316,413 B2
(45) Date of Patent: Nov. 20, 2012

(54) APPARATUS FOR DISPLAYING ELECTRICAL DEVICE USAGE INFORMATION ON A TELEVISION RECEIVER

(75) Inventor: Michael John Crabtree, Keighley (GB)

(73) Assignee: Eldon Technology Limited, Steeton (GB)

(*) Notice: Subject to any disclaimer, the term of this patent is extended or adjusted under 35 U.S.C. 154(b) by 471 days.

(21) Appl. No.: 12/700,408

(22) Filed: Feb. 4, 2010

(65) Prior Publication Data

US 2011/0187930 A1    Aug. 4, 2011

(51) Int. Cl.
H04N 7/16 (2011.01)
H04N 7/173 (2011.01)

(52) U.S. Cl. .......................... 725/141; 725/133; 725/153

(58) Field of Classification Search ................. 725/133, 725/141, 153; 702/60; 348/192–193; 370/245, 370/248
See application file for complete search history.

(56) References Cited

U.S. PATENT DOCUMENTS

| | | | |
|---|---|---|---|
| 4,386,436 A | 5/1983 | Kocher et al. | |
| 4,728,949 A | 3/1988 | Platte et al. | |
| 5,822,012 A | 10/1998 | Jeon et al. | |
| 6,989,731 B1 | 1/2006 | Kawai et al. | |
| 7,395,546 B1 | 7/2008 | Asmussen | |
| 7,739,718 B1 * | 6/2010 | Young et al. | 725/127 |
| 2003/0097452 A1 | 5/2003 | Kim | |
| 2004/0117038 A1 | 6/2004 | Karaoguz et al. | |
| 2004/0148632 A1 | 7/2004 | Park | |
| 2009/0165069 A1 | 6/2009 | Kirchner | |
| 2011/0270549 A1* | 11/2011 | Jeansonne et al. | 702/60 |

FOREIGN PATENT DOCUMENTS

GB    2304952 A    3/1997

OTHER PUBLICATIONS

International Search Report for PCT/EP2011/051608 mailed on May 30, 2011
Lamonica, Martin, "CES 2010 Preview: Green comes in many colors", retrieved from CNET.com (http://ces.cnet.com/8301-31045_1-10420381-269.html), Dec. 22, 2009, 2 pages.

* cited by examiner

Primary Examiner — Hunter B Lonsberry
(74) Attorney, Agent, or Firm — Kilpatrick Townsend & Stockton LLP (57) ABSTRACT

Provided herein are techniques for displaying power usage information on a television receiver. A television receiver receives power usage information regarding electrical devices and outputs the power usage information and status information regarding the electrical device for presentation by a presentation device.

20 Claims, 3 Drawing Sheets

APPARATUS FOR DISPLAYING ELECTRICAL DEVICE USAGE INFORMATION ON A TELEVISION RECEIVER

BACKGROUND

As people try to be more environmentally friendly, it is becoming more important to track electrical device power usage information within a home. For example, many people desire to know how much power is utilized by each device within their home. This allows a person to identify electrical devices which are using too much electricity, either because the devices are inefficient or the devices are being utilized in an inefficient manner. While meters exist to display the total power usage within a home, such meters may lack the granularity to identify particular sources of electrical inefficiency in a home. Furthermore, many appliances are designed to complete specific tasks, such as washing or drying clothes. A user may be watching television while awaiting completion of the task, but may be unable to hear indicators output by the appliance upon completion of the task, and thus, may not be aware of when the task is completed by the appliance.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the monitoring of power usage data regarding electrical devices within a home or other structure. More particularly, a television receiver receives information regarding the power usage of the electrical device from an electrical device, or a monitoring device associated with the electrical device. The television receiver is then operable to output the power usage information for presentation by a presentation device. Additionally, the power usage information may be utilized to identify a current operational status of the electrical device and output an appropriate status message to a user.

In at least one embodiment described herein, a television receiver receives power usage information from electrical devices (or monitoring devices associated therewith) and outputs the power usage information for presentation by a presentation device. The television receiver includes a communication interface operable to receive television programming from a television distribution network and to receive power usage information from an electrical device over a communication network. The television receiver includes an input interface operable to receive user input requesting to view the power usage information. The television receiver also includes control logic operable to output the television programming to a presentation device, process the power usage information and output the power usage information to the presentation device responsive to the user input. For example, the power usage information may be overlaid onto the television programming, may be output by the television receiver adjacent to the television receiver or may be output in a separate display screen, depending on desired design criteria.

Another embodiment described herein provides a television receiver that presents status information regarding an electrical device based on power usage information received from the electrical device or a monitoring device attached to the electrical device. The television receiver includes a communication interface operable to receive television programming from a television distribution network and to receive power usage information from an electrical device over a communication network. The television receiver also includes an input interface operable to receive user input requesting to view the power usage information. The television receiver additionally includes control logic operable to output the television programming to a presentation device, process the power usage information to identify a status of the electrical device and overlay a status message regarding the electrical device onto the television programming output to the presentation device.

Another embodiment provides a monitoring device that monitors power usage information regarding an electrical device and provides the power usage information to a television receiver for presentation to a user. The apparatus includes a first electrical interface that connects to an external power supply line and a second electrical interface communicatively coupled to the first electrical interface to receive electrical power supplied by the power supply line. The second electrical interface further communicatively couples to the electrical device and is operable to supply the electrical power to the electrical device. The apparatus also includes control logic operable to measure a usage of electrical power by the electrical device and generate a usage status message based on the power usage and a communication interface communicatively coupled to the control logic operable to initiate transmission of the usage status message to a television receiver for output to a user.

Figure 1:
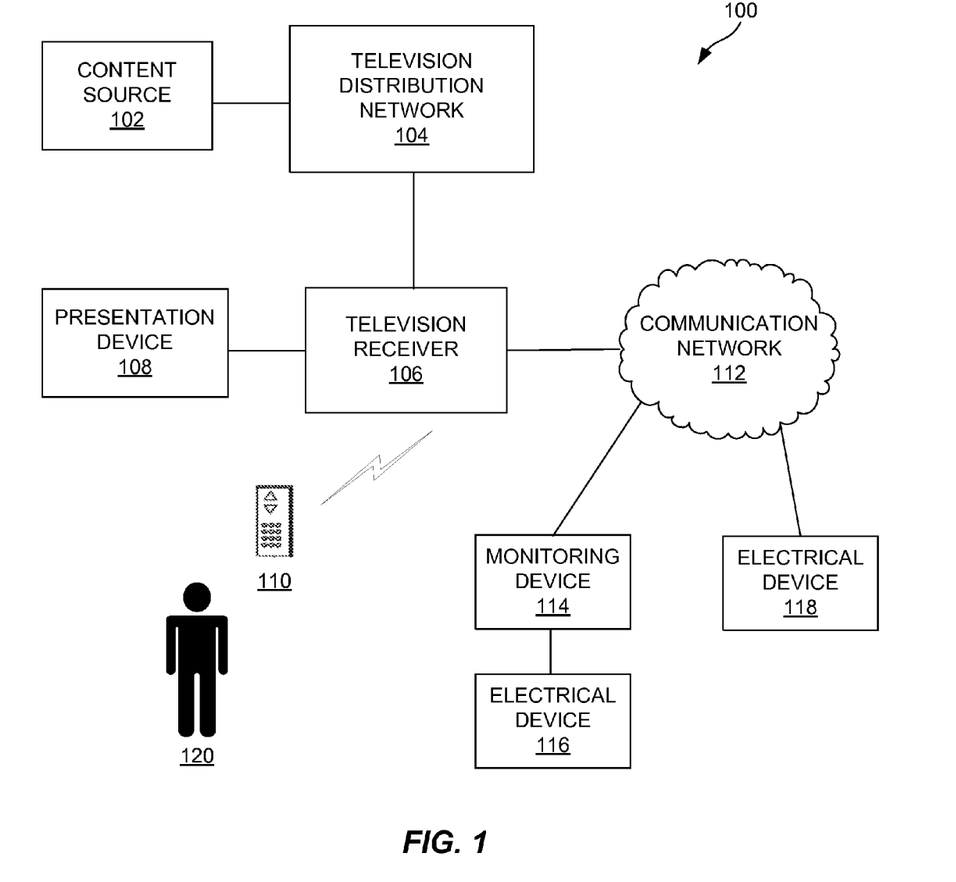
FIG. 1 illustrates an embodiment of a communication system.

FIG. 1 illustrates an embodiment of a communication system 100. The communication system 100 includes a content source 102, a television distribution system 104, a television receiver 106, a presentation device 108, a remote control 110, a communication network 112, a monitoring device 114, a first electrical device 116 and a second electrical device 118. Each of these components is discussed in greater detail below. The communication system 100 may include other components, elements or devices not illustrated for the sake of brevity.

The content source 102 is operable for receiving and/or generating content for communication via the television distribution system 104 to one or more television receivers, e.g., the television receiver 106. The content to be received, processed, outputted and/or communicated may come in any of various forms including, but not limited to, audio, video, data, information, or otherwise. Exemplary content sources 102 include over-the-air (OTA) terrestrial transmission facilities, cable television distribution head-ends, satellite television uplink centers, broadband or internet servers and the like.

The television distribution system 104 is operable to transmit content from the content source 102 to the television receiver 106. The television distribution system 104 may comprise any type of wired (e.g., cable and fiber) and/or wireless (e.g., cellular, satellite, microwave, and other types of radio frequency) communication medium and any desired network topology (or topologies when multiple mediums are utilized). Exemplary television distribution systems 104 include terrestrial, cable, satellite and internet protocol television (IPTV) distribution systems. In at least one embodiment, the television distribution system 104 broadcasts or multicasts content to a plurality of television receivers, e.g., the television receiver 106. The television distribution system 104 may also distribute content to a specific addressable television receiver 106, such as video-on-demand and the like. In at least one embodiment, the content source 102 may be embodied as a transmission facility of the television distribution system 104.

The television receiver 106 is operable to receive content from the television distribution system 104 and output the received content for presentation by the presentation device 108. The television receiver 106 may include a storage medium to store various types of data, such as video content or power usage information, for subsequent presentation to a user. In at least one embodiment, the presentation device 108 is a display device (e.g., a television) configured to display content to a user 120. The television receiver 106 may receive an audio/video stream in any format (e.g., analog or digital format) and output the audio/video stream for presentation by the presentation device 108. In at least one embodiment, the television receiver 106 is a set-top box (e.g., a satellite television receiver, cable television receiver, terrestrial television receiver, internet protocol television receiver or any other type of receiver/converter box) or other similar device that processes and provides one or more audio and/or video output streams to the presentation device 108 for presentation to the user 120. The television receiver 106 may be further configured to output menus and other information that allow the user 120 to control the output of audio/video content by the television receiver 106, view electronic programming guides, set recording timers and the like.

The presentation device 108 may comprise any type of device capable of receiving and outputting a video signal in any format. Exemplary embodiments of the presentation device 108 include a television, a computer monitor, a liquid crystal display (LCD) screen, a touch screen and a projector. The presentation device 108 and the television receiver 106 may be communicatively coupled through any type of wired or wireless interface. For example, the presentation device 108 may be communicatively coupled to the television receiver 106 through a coaxial cable, component or composite video cables, an HDMI cable, a VGA or SVGA cable, a Bluetooth or WiFi wireless connection or the like. In some embodiments, the television receiver 106 and the presentation device 108 may be integrated as a device combining the functionality of a display device and a television receiver, such as a television with integrated CableCard functionality.

The user 120 may control the television receiver 106 using a remote control 110 or other type of data input device compatible with the television receiver 106. The remote control 110 may comprise any system or apparatus configured to remotely control the output of content by the television receiver 106. For example, the remote control 110 may include buttons for receiving input from the user 120. In at least one embodiment, the remote control 110 includes a touch pad for receiving input from the user 120. The remote control 110 may minimally include a transmitter, an input device (e.g., a keypad) and a processor or control logic for controlling the operation of the remote control 110. The remote control 110 may communicate commands to the television receiver 106 requesting to playback content, temporally move through content (e.g., fast-forward or reverse), adjust the volume, access electronic programming guides, set or edit recording timers, edit preferences of the television receiver 106 and the like. In some embodiments, the remote control 110 may additionally be configured to remotely control the presentation device 108. The remote control 110 may communicate with the television receiver 106 and/or the presentation device 108 through any type of wireless communication medium, such as infrared (IR) signals and/or radio-frequency (RF) signals.

The communication network 112 is operable to communicatively couple the television receiver 106 to the monitoring device 114 and/or the electrical device 118. The communication network 110 may utilize any desired combination of wired (e.g., cable and fiber) and/or wireless (e.g., cellular, wireless, satellite, microwave, and radio frequency) communication mediums and any desired network topology (or topologies when multiple mediums are utilized). Exemplary communication networks include television distribution networks, wireless communication networks, public switched telephone networks (PSTN), and local area networks (LAN) or wide area networks (WAN) providing data communication services. In at least one embodiment, the television distribution system 104 and the communication network 110 may be combined into a single physical communication network and/or a single logical communication network, depending on desired design criteria.

The first and second electrical devices 116 and 118 may comprise any type of electrical device within a home or other structure that perform some type of function. In at least one embodiment, the first and second electrical devices 116 and 118 may be connected directly to a power supply line, such as an alternating current (AC) power socket. In other embodiments, the first and second electrical devices 116 and 118 may be indirectly connected to a power supply line, e.g., via a power strip, extension cord or other type of electrical interface. The electrical devices 116 and 118 may have appropriate plugs configured to interface with the AC power sockets.

It is to be appreciated that the electrical devices 116 and 118 may include practically any type of device for which monitoring of the power usage is desired. The devices 116 and 118 may be configured to track and report their power usage information to other devices or alternatively, a monitoring device 114 may be utilized to collect power usage information and report the same to the television receiver 106 for processing. In at least one embodiment, the electrical devices 116 and 118 may comprise typical household appliances such as washing machines, dryers, refrigerators, freezers, stoves, dish washers, microwaves, irons, alarm clocks, trash compactors, water heaters, humidifiers, blenders, food processors, mixers, toasters, coffee makers, espresso makers, bread makers, deep fryers, griddles, pressure cookers, rice cookers, slow cookers, waffle irons or the like. The electrical devices 116 and 118 may also comprise entertainment devices, such as televisions, television receivers, digital video disk (DVD) or other optical disk players, stereos, MP3 players, video game consoles or the like. In at least one embodiment, the electrical devices 116 and 118 may comprise computers or computer peripherals (e.g., scanners, printers, monitors and the like). The electrical devices 116 and 118 may also comprise household lighting, air conditioners, heating systems or the like.

As illustrated in FIG. 1, the electrical device 118 is directly communicatively coupled to the communication network 112. In other words, the electrical device 118 is operable to communicate with other devices of the communication network 112. For example, the electrical device 118 may include an appropriate wired or wireless Ethernet interface that couples to the communication network 112. In at least one embodiment, the electrical device 118 may include a HomePlug® or other type of power line transceiver operable to communicate data to the television receiver 106 over various power supply lines within the structure. For example, the electrical device 118 may transmit power usage information or the like, regarding the electrical power utilized by the electrical device 118, to the television receiver 106. Thus, in at least one embodiment, the electrical device 118 is configured to communicate its power usage information to other devices, such as the television receiver 106.

As further illustrated in FIG. 1, the monitoring device 114 is communicatively coupled to the communication network 112 and provides an interface for other devices of the communication network 112 to access data related to the electrical device 116. The monitoring device 114 may connect to the communication network 112 via any appropriate wired or wireless connection, such as HomePlug®, WiFi, fiber optic connection or the like. The monitoring device 114 is operable to monitor the electrical power usage of the electrical device 116 and transmit data regarding the power usage to the television receiver 106 for further processing. In at least one embodiment, the monitoring device 114 is configured to interface between an AC power socket and a plug of the electrical device 116 and transfer the electrical power from the socket to the electrical device 116. The monitoring device 114 further tracks such electrical power transferred therethrough and provides the power usage data to other devices, such as the television receiver 106.

The television receiver 106 is operable to receive power usage information from the monitoring device 114 and/or the electrical device 118 and process such power usage information to provide appropriate output for display to the user 120 by the presentation device 108. In at least one embodiment, the user 120 may request to view power usage information for the home. The television receiver 106 may then identify the power usage information for various devices and output the power usage data for display by the presentation device. For example, the television receiver 106 may output an appropriate display screen that temporarily replaces the output of television content by the television receiver 106. In another scenario, the television receiver 106 may output an appropriate display screen that is presented adjacent television content (e.g., similar to a side-by-side picture-in-picture (PIP)) display or may overlay data onto television programming output by the television receiver 106.

In at least one embodiment, the television receiver 106 may generate the output screen based on data that is stored in the television receiver 106. For example, the television receiver 106 may periodically receive power usage information from the monitoring device 114 and the electrical device 118 and store the power usage information for subsequent processing and output. The television receiver 106 may collect data from the monitoring device 114 and the electrical device 118 as frequently as desired according to design criteria. In at least one embodiment, the television receiver 106 queries the monitoring device 114 and the electrical device 118 for the power usage data periodically (e.g., every night or every week). The monitoring device 114 and/or the electrical device 118 may also be operable to periodically transmit the power usage data to the television receiver 106 without a query (e.g., according to a predetermined schedule).

In at least one embodiment, the television receiver 106 may retrieve power usage data in real-time from the monitoring device 114 and the electrical device 118 to generate the output screen. For example, the user 120 may provide input requesting to view the power usage information for the house. The television receiver 106 may responsively query each of the monitoring device 114 and the electrical device 118 and utilize the received data to generate an appropriate output screen for presentation by the presentation device 108.

The television receiver 106 may output any level of granularity of data over any appropriate time period, depending on desired design criteria. For example, the television receiver 106 may be operable to output a specific subset of data, such as the power usage of the electrical device 116 over the past week or month. In some embodiments, the television receiver 106 may provide various input mechanisms (e.g., buttons, drop down menus, list boxes and the like) to allow the user 120 to select specific subsets of data for viewing using the remote control 110.

In at least one embodiment, the television receiver 106 may be operable to aggregate data from multiple sources for output. For example, the user 120 may select to view device power usage data for the entire house and the television receiver 106 may operate to aggregate the power usage of the electrical devices 116 and 118 to generate an aggregated usage total (e.g., the total power usage for the home).

The television receiver 106 may also be operable to utilize data received from the monitoring device 114 and/or the electrical device 118 to output various warnings or status messages for presentation to the user 120. For example, the user 120 may set rules on the television receiver 106 requesting the output of an indicator if the power usage of either of the electrical devices 116 and/or 118 increases above a specified threshold or decreases below a specified threshold. Thus, if the television receiver 106 receives data from the monitoring device 114 and/or the electrical device 116, then the television receiver 106 processes the data and if appropriate, outputs a corresponding indicator message.

In at least one embodiment, an increase or decrease in power usage of an electrical device 116 and/or 118 may indicate an error or malfunction in the operation of the electrical device 116 and/or 118. For example, if the power usage of the electrical device 116 decreases below a threshold value, then the device may be shutting off due to a malfunction. Thus, the television receiver 106 may process the decrease in the power usage and provide appropriate messaging to the user 120 regarding the malfunctioning of the electrical device 116.

In at least one embodiment, an increase in power usage of an electrical device 116 and/or 118 may indicate that the device has been activated (e.g., powered on). For example, the electrical device 118 may comprise household lighting in another room of the home than the television receiver 106. Thus, the user 120 may desire to know when the lights have been turned on in the other room. The electrical device 118 may thus transmit information to the television receiver 106 upon activation of the lighting indicating that the lighting has been turned on. The television receiver 106 responsively outputs an appropriate message indicating the status of the lighting.

In at least one embodiment, a decrease in power usage of an electrical device 116 and/or 118 may indicate that the device has completed a designated task. For example, the electrical device 118 may comprise a washing machine tasked to wash clothing. Thus, the user 120 may desire to know when the washing machine has completed the wash cycle. The electrical device 118 may thus transmit information to the television receiver 106 upon completion of the washing cycle. For example, the electrical device 118 may output its current power usage or a recent change in the power usage of the electrical device 118 corresponding with completion of the washing machine task. The television receiver 106 responsively outputs an appropriate message indicating the status of the washing machine task. For example, the television receiver 106 may overlay a banner message onto television programming, indicating that the washing machine is done washing the clothing.

Figure 2:
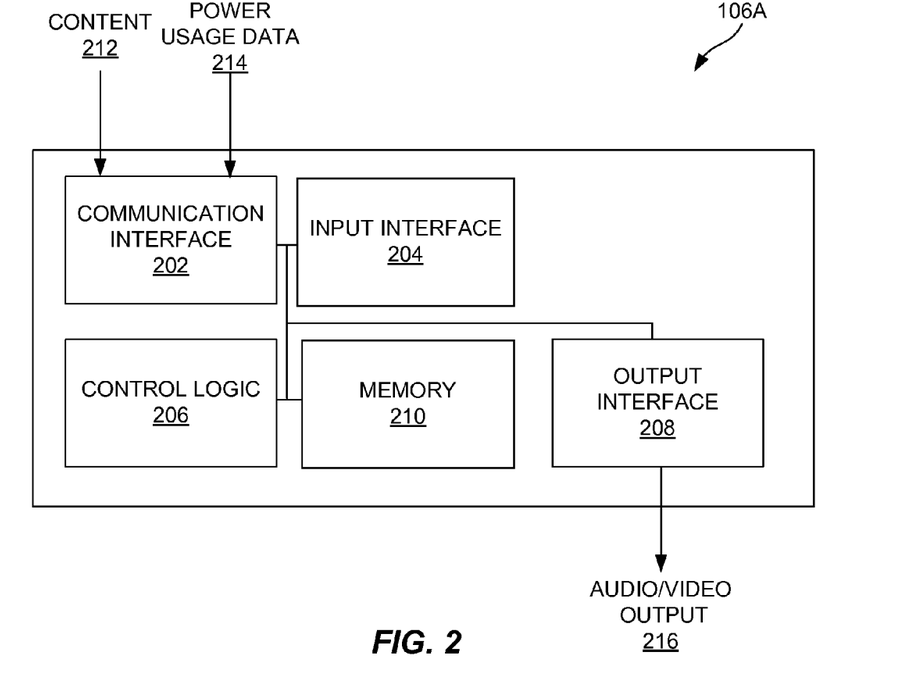
FIG. 2 illustrates an embodiment of a television receiver of FIG. 1.

FIG. 2 illustrates an embodiment of a television receiver 106A of FIG. 1. The television receiver 106A of FIG. 2 will be discussed in reference to the communication system 100 of FIG. 1. The television receiver 106A includes a communication interface 202, an input interface 204, control logic 206, an output interface 208 and memory 210. Each of these components is discussed in greater detail below. The television receiver 106A may include other components, elements or devices not illustrated for the sake of brevity.

The communication interface 202 is operable to receive content 212 from the television distribution system 104. More particularly, in at least one embodiment, the communication interface 202 receives and tunes a television signal including television programming. The communication interface 202 may receive an over-the-air (OTA) broadcast, a direct broadcast satellite signal, a cable television signal or an IPTV signal and tune the content 212 to extract the selected television programming. In at least one embodiment, the communication interface 202 may comprise multiple tuners, utilized by the television receiver 106A to output and/or record multiple television programs simultaneously.

The communication interface 202 is further operable to receive power usage data 214 from the monitoring device 114 and/or the electrical device 118 (see FIG. 1) via the communication network 112. The power usage data 214 may be stored in the memory 210 for subsequent usage or processed by the control logic 206 as described in further detail below. In at least one embodiment, the communication interface 202 may include a network interface, such as a WiFi transceiver, Ethernet transceiver or HomePlug® transceiver for communication with the communication network 110. The communication interface 202 may receive the content 212 and the power usage data 214 via the same or different communication networks depending on desired design criteria. Furthermore, the communication interface 202 may include any number of discrete communication interfaces to exchange data with external sources, such as the content source 102, the monitoring device 114 and/or the electrical device 118. For example, the communication interface 202 may include a satellite television tuner to receive content from a satellite television distribution network and may include a network interface to receive content from a discrete data communication network, such as a local area network (LAN) or wide area network (WAN).

The input interface 204 is operable to wirelessly receive data from the remote control 110 (see FIG. 1) or other input device, such as a keyboard, mouse, mobile communication device or the like. The input interface 204 may communicate with a remote control utilizing any type of IR and/or RF communication link. In at least one embodiment, the input interface 204 receives a key code from a remote control (not shown in the figures) and responsively provides the key code to the control logic 206 for processing. The data received from the remote control 110 may be utilized by the control logic 206 to control the output of content by the television receiver 106A.

The control logic 206 is operable to control the operation of the television receiver 106A. The control logic 206 may be a single processing device or a plurality of processing devices that cooperatively operate to control the operation of the television receiver 106A. In at least one embodiment, the operation of control logic 206 may be controlled by instructions executable by control logic 206. Some examples of instructions are software, program code and firmware. Various embodiments of control logic 206 include any sort of microcontroller or microprocessor executing any form of software code. The control logic 206 controls the reception of data/content by the communication interface 202 and the output of video content by the output interface 208. In at least one embodiment, the control logic 206 is operable to generate menus, such as electronic programming guide menus, or power usage data menus for presentation by the presentation device 108. The control logic 206 may include various components or modules for processing and outputting audio/video content. Exemplary components or modules for processing audio/video content include a demodulator, a decoder, a decompressor, a conditional access module and a transcoder module.

The control logic 206 is communicatively coupled to the memory 210, which is operable to store data during operation of the control logic 206. Such data may include software and firmware executed by the control logic 206 as well as system and/or program data generated during the operation of the control logic 204. Memory 210 may comprise any sort of digital memory (including any sort of read only memory (ROM), RAM, flash memory and/or the like) or any combination of the aforementioned. In at least one embodiment, the memory 210 is arranged to store power usage data, received by the communication interface 202 from the monitoring device 114 and/or electrical device 118, for subsequent usage in generating power usage information display screens for presentation by the presentation device 108.

The television receiver 106A also includes an output interface 208 operable to interface with the presentation device 108. More particularly, the output interface 208 is operable to output audio/video content 216 for presentation by the presentation device 108 (see FIG. 1). The output interface 208 may be operable to output any type of presentation data to the presentation device 108, including audio data, video data, audio/video (A/V) data, textual data, imagery or the like. In other embodiments, the output interface 208 may comprise a network interface operable to transmit data to other components, devices or elements, such as other computers, servers and the like. The output interface 208 may receive data from the control logic 206 and/or other components of the television receiver 106A for output to the presentation device 108 (see FIG. 1).

In at least one embodiment, the output interface 208 may include multiple output connections operable to transmit data to the presentation device 108 in multiple formats through multiple communication mediums. For example, the output interface 208 may include a modulator operable to modulate data onto an NTSC channel for transmission to the presentation device 108 through a coaxial cable. In other embodiments, the output interface 208 may include composite or component outputs which communicatively couple to similar outputs of the presentation device 108 through appropriate cabling. In at least one embodiment, the output interface 208 comprises a High Definition Multimedia Interface (HDMI) that outputs high definition content to the presentation device 108.

In at least one embodiment, the output interface 208 bi-directionally communicates with the presentation device 108. For example, an HDMI port is capable of bi-directionally communicating with the presentation device 108. The output interface 208 may receive various types of data from the presentation device 108 over the bi-directional communication link. For example, the presentation device 108 may transmit information identifying itself and/or its capabilities to the output interface 208. Other bi-directional communication links, such as Ethernet, WiFi, IEEE 1394, USB and the like are also possible in accordance with various embodiments. In at least one embodiment, the presentation device 108 may provide power usage data to the television receiver 106A via the bi-directional output interface 208.

In accordance with at least one embodiment, the communication interface 202 receives power usage data 214 from the monitoring device 114 and/or the electrical device 118. As described above, such power usage data 214 may be received by the communication interface 202 responsive to communications initiated by the monitoring device 114 and/or the electrical device 118 or may alternatively be received responsive to communications initiated by the control logic 206. The communication interface 202 then provides the power usage data 214 to the control logic 206 for further processing. The control logic 206 may then process the power usage data 214 to generate appropriate output data or coordinate storage of the power usage data 214 onto the memory 210 for subsequent usage.

As described above, the control logic 206 may process the power usage data 210 to provide status messages regarding an electrical device 116 and/or 118. The control logic 206 generates the status messages based on the power usage data 214. For example, the control logic 206 may generate a status message, for overlay onto television programming, indicating that a washing machine has completed the task of washing a load of laundry. In another embodiment, the control logic 206 may generate a status message indicating that a garage door opener has been activated and is currently opening the garage door. In at least one embodiment, the control logic 206 is operable to correlate the powering off of an electrical device 116 and/or 118 with completion of a task by the device and output an appropriate status message regarding the same.

In another embodiment, the input interface 204 may receive user input from the remote control 110 (see FIG. 1) requesting to view power usage information for the house. The control logic 206 processes the input and responsively generates an appropriate display menu presenting the power usage for one or more of the electrical devices 116 and 118 in the house. As described above, the control logic 206 may generate the output display screen based on data stored in the memory 210 and/or may query the monitoring device 114 and the electrical device 118 to obtain the power usage data 214 utilized to generate the power usage display screen.

Figure 3:
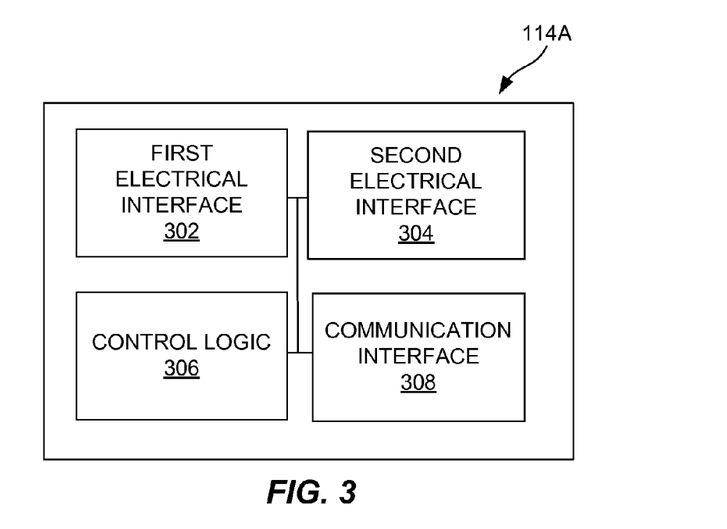
FIG. 3 illustrates an embodiment of the monitoring device of FIG. 1.

FIG. 3 illustrates an embodiment of the monitoring device of FIG. 1. The monitoring device 114A will be described in reference to the communication system 100 of FIG. 1. The monitoring device 114A includes a first electrical interface 302, a second electrical interface 304, control logic 306 and a communication interface 308. Each of these components is discussed in greater detail below.

The first electrical interface 302 is operable to connect to an external power supply line. The first electrical interface 302 is operable to receive electrical power from the external power supply line. In at least one embodiment, the first electrical interface 302 comprises a plug that connects to a socket of the external power supply.

The second electrical interface 304 is communicatively coupled to the first electrical interface 302 to receive electrical power supplied by the power supply line. The second electrical interface 304 is further communicatively coupled to the electrical device and operable to supply the electrical power to the electrical device 116 (see FIG. 1). In other words, the first electrical interface 302 and the second electrical interface 304 operate to transfer electrical power from the external supply line to the electrical device 116. In at least one embodiment, the second electrical interface 304 comprises a second socket that connects to a plug of the electrical device 116.

The control logic 306 is operable to control the operation of the monitoring device 114A. The control logic 306 may be a single processing device or a plurality of processing devices that cooperatively operate to control the operation of the monitoring device 114A. Various embodiments of control logic 306 include any sort of microcontroller or microprocessor executing any form of software code. The functionality of the control logic 306 may also be implemented in hardware or any combination of software/hardware, depending on desired design criteria.

The control logic 306 is operable to monitor the power usage of the electrical device 116. More particularly, the control logic 306 is operable to monitor and track the amount of electrical power that is transmitted from the first electrical interface 302 to the second electrical interface 304. The control logic 306 may include associated memory (not shown in FIG. 3), such as RAM, battery backed up memory or flash to store the power usage information. The control logic 306 may then periodically transmit the power usage information to the television receiver 106 (see FIG. 1) or provide such information to the television receiver 106 responsive to queries from the television receiver 106.

The control logic 306 may also generate a usage status message, based on the power usage information, and initiate transmission of the usage status message to the television receiver 106. For example, the control logic 306 may generate the usage status message responsive to determining that the power usage of the electrical device 116 is above or below a specified threshold. In at least one embodiment, the usage status message may include a display message that may be output by the television receiver 106.

The communication interface 308 communicatively couples to the communication network 112 (see FIG. 1) and exchanges data with the television receiver 106. The communication interface 308 may include any type of network interface, such as a WiFi transceiver, Ethernet interface or HomePlug® transceiver for communication with the communication network 110. In at least one embodiment, the communication interface 308 comprises a HomePlug® transceiver and may be integrated with the first electrical interface 302. In other words, the communication interface 308 may transmit data to the same external power supply line that the first electrical interface 302 receives power therefrom.

The communication interface 308 may receive queries from the television receiver 106 and/or transmit messages to the television receiver 106 responsive to a command from the control logic. For example, the control logic 306 may aggregate power usage information over a period of time and initiate transmission of the power usage information to the television receiver 106 via the communication interface 308. In at least one embodiment, the power usage information may be transmitted to the television receiver 106 in a message that includes identifying information regarding the monitoring device 114 and/or the attached electrical device 116.

The control logic 306 may also generate messages, rather than power usage information, for transmission to the television receiver 106. For example, the control logic 306 may implement rules to generate status messages regarding the power usage of the electrical device. In at least one embodiment, the control logic 306 may monitor the power usage of the electrical device 116 to determine when the electrical device 116 has completed a specific task, such as washing clothes). The control logic 306 may then generate an appropriate message, which is transmitted by the communication interface 308 to the television receiver 106 for output by the presentation device 108. It is to be appreciated that any type of rule may be applied by the control logic 306 to the processing of the power usage information in order to generate appropriate status messages for output by the television receiver 106 (e.g., a device has been turned on/off, a device is malfunctioning, a device has completed its task and the like).

Figure 4:
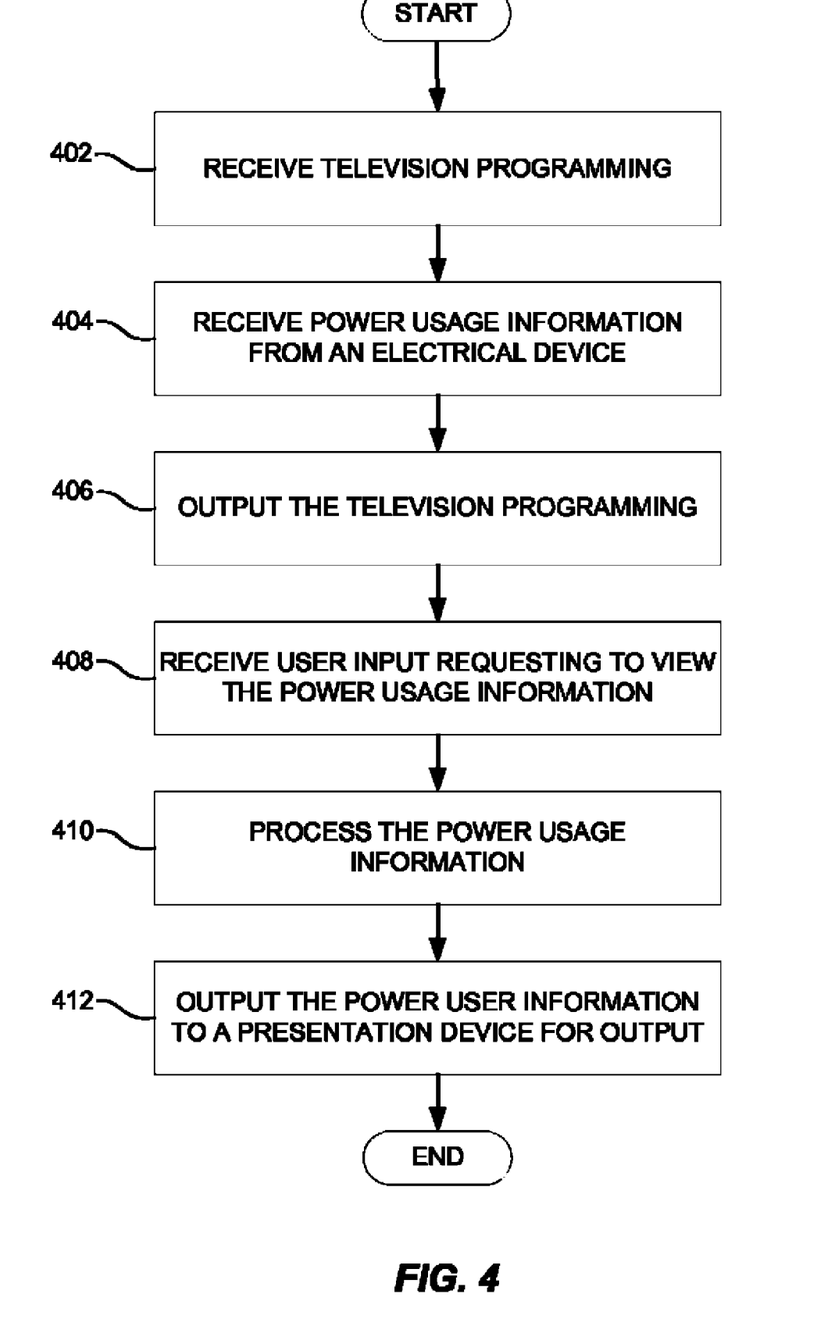
FIG. 4 illustrates an embodiment of a process for outputting power usage information.

FIG. 4 illustrates an embodiment of a process for outputting power usage information. More particularly, the process of FIG. 4 may be performed by a television receiver to aggregate power usage information for output to a user. The process of FIG. 4 may include other operations not illustrated for the sake of brevity.

The process includes receiving television programming, at a television receiver, from a television distribution network (operation 402). The process further includes receiving power usage information, from an electrical device, over a communication network (operation 404). As described above, the power usage information may be received directly from the electrical device for which the data corresponds with the device or may be received from a monitoring device tasked with collecting such power usage data regarding the device.

The process further includes outputting the television programming to a presentation device (operation 406) and receiving user input requesting to view the power usage information (operation 408). Responsive to the user input, the process includes processing the power usage information (operation 410) and outputting the power usage information to the presentation device responsive to the user input (operation 412). For example, the television receiver may replace the power usage information temporarily with a display screen that includes and/or describes the power usage information. Thus, a user is able to view the power usage information for multiple devices in a single, convenient location.

Although specific embodiments were described herein, the scope of the invention is not limited to those specific embodiments. The scope of the invention is defined by the following claims and any equivalents therein.

I claim:

1. A television receiver comprising:
a communication interface operable to receive television programming from a television distribution network and to receive power usage information from an electrical device over a communication network;
an input interface operable to receive user input requesting to view the power usage information; and
control logic operable to:
output the television programming to a presentation device;
process the power usage information; and
output the power usage information to the presentation device responsive to the user input.

2. The television receiver of claim 1, wherein the control logic outputs the power usage information, in place of the television programming, responsive to the user input.

3. The television receiver of claim 2, wherein the control logic receives first and second power usage information from a plurality of electrical devices, aggregates the first and second power usage information to generate aggregated power usage information and outputs the aggregated power usage information to the presentation device.

4. The television receiver of claim 1, wherein the communication interface receives the power usage information from the electrical device over a wireless communication network.

5. The television receiver of claim 1, wherein the communication interface comprises a HomePlug transceiver and the communication interface and the electrical device communicate over a power supply line.

6. The television receiver of claim 1, wherein the control logic is operable to generate a request for transmission to the electrical device responsive to the user input, the request soliciting the power usage information from the electrical device.

7. The television receiver of claim 1, wherein the communication interface receives the power usage information according to a periodic schedule.

8. The television receiver of claim 1, wherein the control logic processes the power usage information and outputs a status message, regarding the electrical device, to the presentation device.

9. The television receiver of claim 1, wherein the status message is overlaid onto the television programming.

10. An apparatus comprising:
a first electrical interface that connects to an external power supply line;
a second electrical interface communicatively coupled to the first electrical interface to receive electrical power supplied by the power supply line, the second electrical interface further communicatively coupled to the electrical device and operable to transfer the electrical power to the electrical device;
control logic operable to measure a usage of electrical power by the electrical device and generate a usage status message based on the usage; and
a communication interface communicatively coupled to the control logic operable to initiate transmission of the usage status message to a television receiver for output to a user.

11. The apparatus of claim 10, wherein the first electrical interface comprises a first plug that connects to a first socket of the external power supply line and the second electrical interface comprises a second socket that connects to a second plug of the electrical device.

12. The apparatus of claim 11, wherein the communication interface comprises a HomePlug transceiver integrated with the first electrical interface.

13. The apparatus of claim 10, wherein the communication interface comprises a wireless transceiver communicatively coupled to a wireless communication network.

14. The apparatus of claim 10, wherein the control logic is operable to generate the usage status message responsive to determining that the usage is above a specified threshold.

15. The apparatus of claim 10, wherein the control logic is operable to generate the usage status message responsive to determining that the usage is above a specified threshold.

16. The apparatus of claim 10, wherein the usage status message includes a display message for output by the television receiver.

17. A television receiver comprising:
a communication interface operable to receive television programming from a television distribution network and to receive power usage information from an electrical device over a communication network;
an input interface operable to receive user input requesting to view the power usage information; and
control logic operable to:
output the television programming to a presentation device;
process the power usage information to identify a status of the electrical device; and overlay a status message regarding the electrical device onto the television programming output to the presentation device.

18. The television receiver of claim 17, wherein the control logic processes the power usage information to identify whether a power usage of the electrical device is above a threshold, wherein the power usage above the threshold indicates that the electrical device has been powered on, the control logic further operable to output the status message indicating that the electrical device has been powered on.

19. The television receiver of claim 17, wherein the control logic processes the power usage information to identify whether a power usage of the electrical device is below a threshold, wherein the power usage below the threshold indicates that the electrical device has been powered off, the control logic further operable to output the status message indicating that the electrical device has been powered off.

20. The television receiver of claim 19, wherein the control logic is further operable to correlate the powering off of the electrical device with completion of a task by the electrical device, the control logic further operable to output the status message indicating completion of the task.

* * * * *